(12) United States Patent
Hackel et al.

(10) Patent No.: US 6,368,741 B1
(45) Date of Patent: Apr. 9, 2002

(54) STOPPER PLUG FOR STORAGE BATTERIES

(76) Inventors: Josef Hackel, Grabnerstr. 53, A-4020 Linz; Norbert Maleschitz, Donauschabenstr. 2, A-4600 Wels; Franz Zwingl, Traundorferstr. 122a., A-4030 Linz, all of (AT); Thorsten Wiemer, Brunhuberstr. 96, 83512 Wasserburg (DE)

( * ) Notice: Subject to any disclaimer, the term of this patent is extended or adjusted under 35 U.S.C. 154(b) by 0 days.

(21) Appl. No.: 09/433,240

(22) Filed: Nov. 4, 1999

Related U.S. Application Data

(63) Continuation-in-part of application No. 09/015,124, filed on Jan. 29, 1988, now abandoned.

(30) Foreign Application Priority Data

Jan. 30, 1997 (DE) .......................................... 197034444

(51) Int. Cl.⁷ ................................................ H01M 2/12
(52) U.S. Cl. ............................. 429/53; 429/82; 429/86
(58) Field of Search .................. 429/53–56, 82, 429/86, 89

(56) References Cited

U.S. PATENT DOCUMENTS

| 3,953,566 A | 4/1976 | Gore |
| 4,031,294 A | 6/1977 | Sano |
| 4,187,390 A | 2/1980 | Gore |
| 4,636,446 A | 1/1987 | Lee ............................. 429/54 |
| 4,885,218 A | 12/1989 | Andou et al. ................. 429/53 |
| 5,209,992 A | 5/1993 | Feres ........................... 429/86 |
| 5,407,760 A | 4/1995 | Kasner et al. ................. 429/54 |
| 5,476,589 A | 12/1995 | Bacino .................. 210/500.36 |

FOREIGN PATENT DOCUMENTS

| DE | 346621 | 12/1919 |
| DE | 30 18372 | 5/1980 |
| DE | 91 04 291.7 | * 8/1991 |
| DE | 196 42 238 C | 12/1997 |
| FR | 1 373 053 | 1/1965 |
| FR | 1 543 874 | 10/1968 |
| FR | 2 222 758 | 10/1974 |
| FR | 2 497 605 | 7/1982 |
| GB | 324 533 | 1/1930 |
| JP | 61 161655 | 7/1986 |
| JP | 61 161656 | 7/1986 |
| JP | 61 165954 | 7/1986 |
| JP | 62 122054 | 6/1987 |
| JP | 62 232853 | 10/1987 |
| JP | 63 244554 | 10/1988 |
| JP | 01 161663 | 6/1989 |
| JP | 07 220706 | 8/1995 |

* cited by examiner

*Primary Examiner*—Gabrielle Brouillette
*Assistant Examiner*—Jonathan Crepeau
(74) *Attorney, Agent, or Firm*—Allan M. Wheatcraft

(57) ABSTRACT

A plug for batteries, especially for lead storage batteries is described in which gas exchange occurs through a liquid-impermeable and gas-permeable element (2) and in which an aerosol separator (3) is arranged between the element (2) and the gas space above the electrolyte. The aerosol separator according to the invention can be a centrifugal separator, a cascade separator, or an inertial separator or consist of a combination of at least two of the aforementioned.

14 Claims, 3 Drawing Sheets

(A - A)

STOPPER PLUG FOR STORAGE BATTERIES

CROSS-REFERENCE TO RELATED APPLICATIONS

The present application is a continuation-in-part of U.S. patent application Ser. No. 09/015,214, filed Jan. 29, 1988 now abandoned.

FILED OF THE INVENTION

The present invention relates to a combination of a battery and a plug.

BACKGROUND OF THE INVENTION

Batteries, especially lead storage batteries, invariably produce gases because of the underlying electrochemical processes during discharge and charging. The closure plugs of the cells therefore have holes through which gas exchange can occur. The ordinary plugs have a disadvantage in that they do not seal the cells completely liquid-tight, which can lead under extreme operating conditions or accidents and emergencies to leakage of very aggressive and highly corrosive electrolyte solutions, like sulfuric acid, and therefore to serious disadvantages and hazards.

German Utility Models DE-U 91 04 291 and DE-U 93 12 173 describe closure plugs for a lead storage battery in which a microporous frit or a microporous element is mounted in front of a pressure relief valve in the gas outlet direction. A disadvantage during the use of microporous elements is that the aerosols and especially sulfuric acid can clog or seal the pores of the microporous element because it creep into these. Gas permeability is extremely reduced by this and the storage battery is no longer safe.

Another disadvantage is that these elements are not liquid-repellent. For this purpose German Patent publication DE-OS 38 05 570 describes a porous inorganic substance in which the surface of the pores is coated with an internal film of silane or titanium adhesive and an external film of fluorocarbon resin. Such elements can only be produced with difficulty and are therefore very expensive.

U.S. Pat. No. 4,636,446 (LEE) discloses a stopper for a storage battery having a porous plastic body made of a spongy plastic and a spiral-shaped body provided with notches at both ends. The porous plastic body has numerous pores and is only permeable to gas. However the spongy plastic body is able to absorb water and is therefore permeable for liquids. Furthermore, the aerosols of the electrolyte creep into the pores of the spongy plastic body and block and close these pores.

French Patent FR-B-1,543,874 teaches a valve comprising a fibrous diaphragm made of highly hydrophobic fiber and an intercepting plate. This construction is not resistant to the electrolyte and aerosols of the electrolyte are able to creep into the diaphragm and block and close these pores.

SUMMARY OF THE INVENTION

The object of the present invention is therefore to improve the durability of a plug for a battery that is liquid impermeable and gas permeable.

The novel combination of a battery and a plug of the present invention is designated to solve the above discussed problems and provide significant advantages over the plugs of the prior art, as described in more detail herein.

The present invention is directed to a combination of a battery and a plug. The plug is situated in an opening of the battery and has a liquid impermeable but gas permeable membrane, being made of expanded microporous polytetrafluoroethylene (ePTFE), and an aerosol separator. The exchange of gas between the gas space and the outside of the battery takes place through the liquid impermeable but gas permeable membrane and the aerosol separator.

A plug according to the invention therefore includes an ePTFE-membrane that permits gas exchange between the gas space inside the battery and its surroundings and an aerosol separator, which separates electrolyte vapors and aerosols entrained by the electrolysis gases before they can reach the membrane. This arrangement achieves a situation in which the battery cell is degassed without the membrane being wetted by electrolyte aerosols, in which case a reduction in gas exchange would occur. Further, the novel combination of a battery and a plug ensure that the battery is protected from leakage of electrolyte in any position of the battery, because the ePTFE membrane is impermeable to liquids, especially to electrolytes like sulphuric acid. In one embodiment the membrane contains an oleophobic material. Preferably the membrane is laminated to at least one layer consisting of a support material. The support material protects and supports the membrane against mechanical loadings.

In a further embodiment the membrane has a pore size of at most 1 $\mu$m. a porosity of at least 50% and a dried thickness most 5 $\mu$m. These parameters ensure the high and effective gas permeability of the membrane over the lifetime of the plug. The aerosol separator is chosen from one of the following group of separators: a fiber absorber, a centrifugal separator, a cascade separator, an inertial separator, a combination of at least two of the aforementioned. Preferably the aerosol separator is a combination of an inertial separator, a centrifugal separator and a cascade separator. This construction of an aerosol separator ensures the effective separation of the aerosols in the electrolysis gas. The electrolysis gas without aerosols can reach the membrane.

BRIEF DESCRIPTION OF THE DRAWINGS

The foregoing summary, as well as the following detailed description of the invention, will be better understood when read in conjunction with the appended drawings. For purpose of illustrating the invention, embodiments which are presently preferred are shown in the drawings. It should be understood, however, that the invention is not limited to the precise arrangements and instrumentalities shown in the drawings.

DETAILED DESCRIPTION OF THE INVENTION

The present invention is directed to an improved combination of a battery and a plug wherein the plug is constructed from a liquid impermeable but gas permeable membrane being made of expanded microporous polytetrafluoroethylene (ePTFE) and an aerosol separator.

Figure 1:
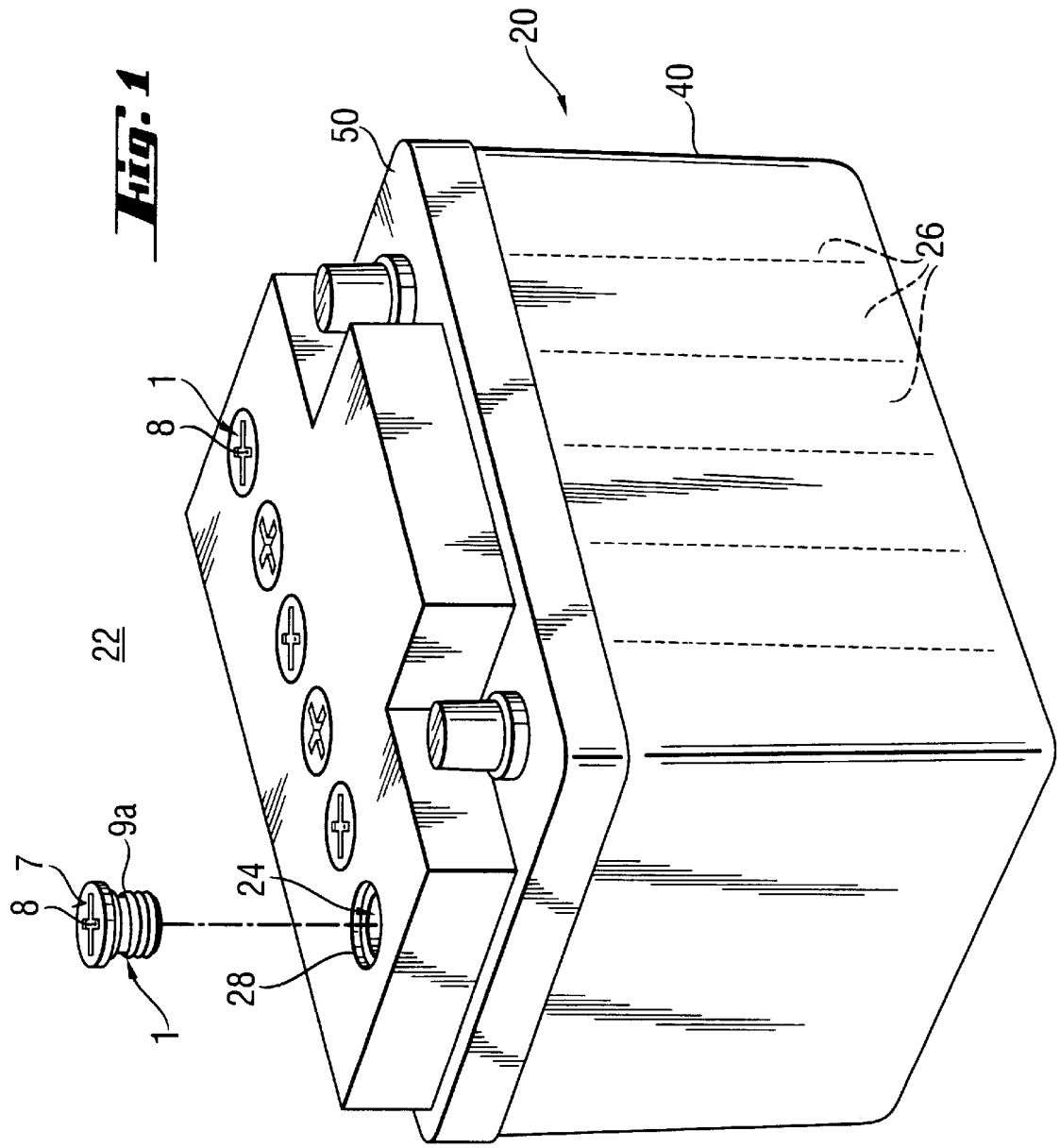
FIG. 1 is a perspective view of a battery and a plug in accordance with the present invention.

Referring to FIG. 1, a battery 20 with a case 40 and a lid 50 is shown. The case 40 with the lid 50 determine an outside 22 and an inside 24 of the battery 20. On the inside 24 of the battery 20 may be one or more electro-chemical cells 26. The electro-chemical cells 26 may be arranged behind each other or parallel to each other. Because of the need of degassing the battery 20, every battery 20 has at least one opening 28 connecting the inside 24 of the battery 20 with the outside 22 of the battery 20. The at least one opening 28 is closed with a plug 1. In one embodiment every electrochemical cell 26 has a corresponding opening 28 with a plug 1 in the lid 50. In a further embodiment the electro-chemical cells 26 may degassed about at least one central opening 28 with a plug 1 in the lid 50.

The plug 1 has at least one hole 8 in the top 7, which serves for ventilation from the inside 24 to the outside 22 of the battery 20. In a further embodiment the plug 1 may have more than one hole 8 in the top 7.

The plug 1 can be secured in the opening 28 by welding, screwing, clamping and molding. In the depicted embodiment the plug 1 has an outer screw thread 9a to screw the plug 1 into the lid 50 of the battery 20.

Figure 2:
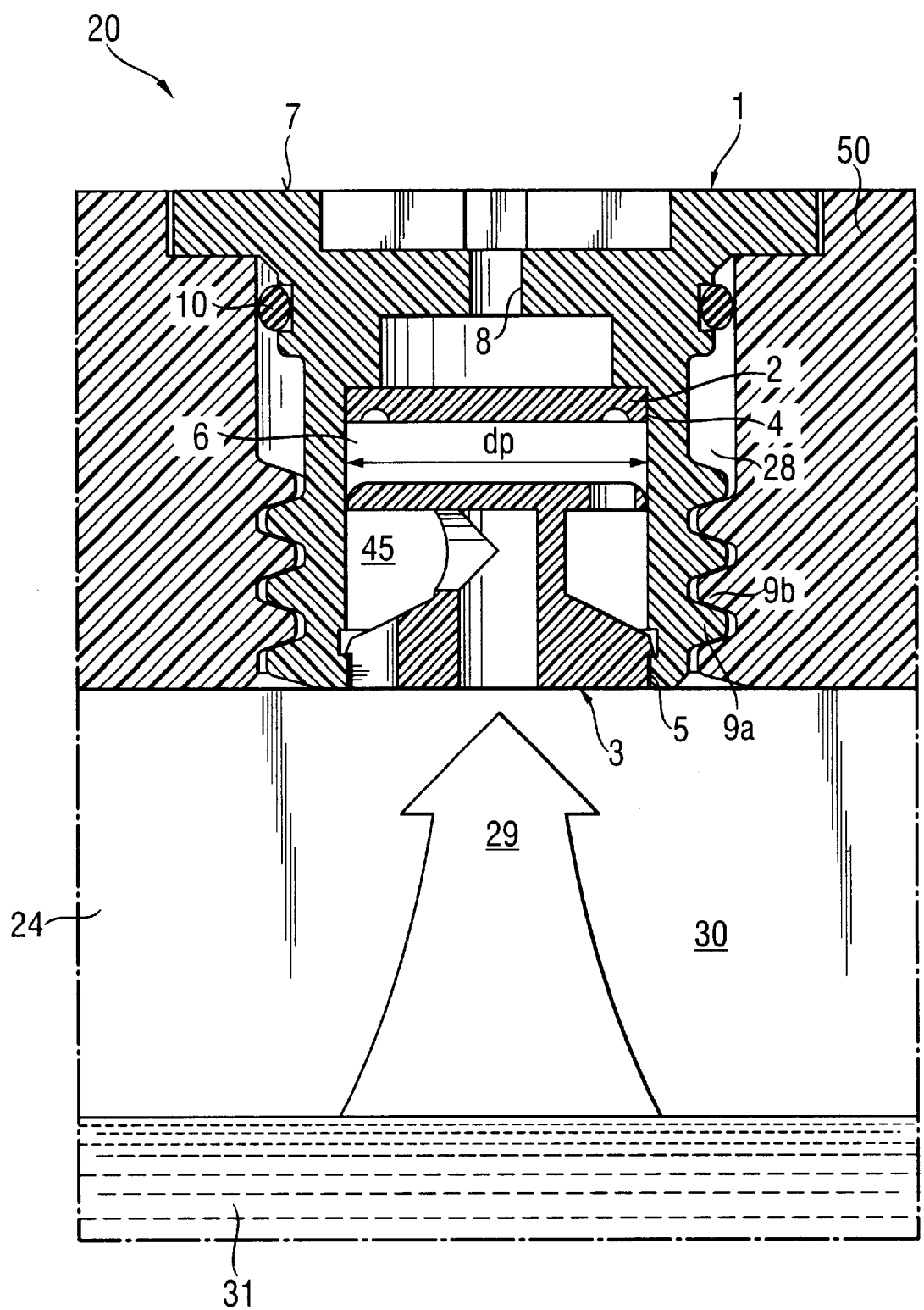
FIG. 2 shows a cross section through a battery and a plug closing an opening in the battery.

FIG. 2 shows a plug 1 of the present invention, located in a opening 28 in the lid 50 of a battery 20. The inside 24 of the battery 20 has an electrolyte 31 for example sulphuric acid, and a gas space 30 above. The plug 1 has an inside diameter dp, an inside surface 6 and includes a liquid impermeable but gas permeable membrane 2 and an aerosol separator 3. The membrane 2 has an outer membrane circumference 4 and the aerosol separator 3 has an separator circumference 5. The membrane 2 and aerosol separator 3 are firmly attached to the plug 1 so that neither gases nor liquids can penetrate between the inside surface 6 of the plug and the membrane circumference 4 and separator circumference 5. An O-ring 10 seals the plug 1 in the opening 28 of the battery 20. The plug 1 also has a hole 8 on the top 7, which serves for ventilation to the atmosphere.

The plug 1 has an outer screw thread 9a to screw the plug 1 into the opening 28 of the battery lid 50 which is provided with a corresponding inner thread 9b. The plug 1 is designed in one embodiment as a plastic injection molded part. Plastic materials for the injection molding process have to be resistant to the electrolyte 31. Prefered plastic materials are polypropylene and polyethylene.

Production of plug 1, according to the invention, occurs so that the membrane 2 is welded, clamped, molded, injection molded or joined in some other appropriate fashion to the injection molded part of the plug 1. The fastening of the membrane 2 to the plug 1 has to be liquid-tight in order to prevent leakage of the electrolyte 31. The aerosol separator 3 is also clamped, welded, molded or joined in some other way to the injection molded part of the plug 1. Also the aerosol separator 3 has to be fastened liquid-tight to the plug 1 in order to prevent leakage of the electrolyte 31.

The membrane 2 according to the invention is a microporous membrane of expanded polytetrafluoroethylene.

By "microporous" is meant that the morphology of the microporous material is such that the micropores extend from one side to the other side of the material.

Porous polytetrafluoroethylene membranes suitable for use in the invention can be made by processes known in the art, for example, by stretching or drawing processes, by papermaking processes, by processes in which filler materials are incorporated with the PTFE resin which are subsequently removed to leave a porous structure, or by powder sintering processes. Preferably the porous polytetrafluoroethylene film is porous expanded polytetrafluoroethylene film having a structure of interconnected nodes and fibrils, as described in U.S. Pat. Nos. 3,953,566 and 4,187,390 which describe the preferred material and processes for making them. The nodes and fibrils define an internal structure having a three-dimensional network of interconnected passages and pathways which extend vertically, from surface to surface, and laterally, from edge to edge, throughout the membrane. The porous polytetrafluoroethylene film (of the release surface material) should have a thickness in the range 3 to 1,000 micrometers, preferably in the range 5 to 100 micrometers; a pore volume in the range 20 to 98 percent, preferably in the range 50 to 90 percent; and a nominal pore size in the range 0,05 to 15 micrometers, preferably in the range 0.1 to 2 micrometers.

The membrane 2 according to the invention can also be laminated to at least one layer consisting of a support material.

The support material for lamination consists of nonwoven fabric, a woven fabric, a knitted fabric, a perforated plate or a mesh.

In order to achieve the necessary rapid gas exchange, the membrane 2 according to the invention must meet certain geometric and physical requirements. It has surprisingly been demonstrated that gas exchange occurs quite effectively if the membrane 2 has a pore size of at most 1 $\mu$m, a porosity of at least 50% and a thickness of at most 20 $\mu$m.

The pore size is preferably at most 0.5 $\mu$m, the porosity at least 65% and the thickness at most 10 $\mu$m.

It is particularly preferred if the pore size is 0.45 $\mu$m at most, the porosity at least 70% and the thickness at most 5 $\mu$m.

Pore size measurements are made by the Coulter Porometer™, manufactured by Coulter Electronics, Inc., Hialeah, Fla. The Coulter Porometer (TM) is an instrument that provides automated measurement of pore size distributions in porous media using the liquid displacement method (described in ASTM Std. F316-86).

Thickness of the base material was determined with the use of a snap gauge (Johannes Käfer Co. Model No. F1000/302). Measurements were taken in at least four areas of each specimen. Thickness of the dried composite membrane was also obtained with the use of the snap gauge.

The membrane 2 of the present invention is liquid impermeable but gas permeable.

The term "liquid-impermeable" means that the membrane to be examined does not allow the passage of liquids such as water and electrolyte acid like sulphuric acid. The liquid-impermeability is determined by means of the hydrostatic water pressure test which is described in ISO Standard No. 811 from 1981. As test liquid sulphuric acid used to carry out this test. The sulphuric acid is applied to the membrane at a pressure of 100 mbar and a temperature of 40° C. The membrane is able to withstand the acid for more than 12 hours.

The term "permeable" (and correspondingly "impermeable") is used herein to describe the property of the membrane to transport (or not transport) a particular species, such as gas or water-vapor, through the membrane. The term describes the overall effect of mass transfer by diffusion, and in no way implies any particular scientific mechanism by which this occurs.

The gas permeability can determined by the Air Flow Data. The Gurley air flow test measures the time in seconds for 100 cc of air to flow through a one square inch sample at 4.88 inches of water pressure. The sample is measured in a Gurley Densometer (see ASTM D726-58). The sample is placed between the clamp plates. The cylinder is then dropped gently. The automatic timer (or stopwatch) is used to record the time (seconds) required for a specific volume recited above to be displaced by the cylinder. This time is called the Gurley number.

The microporous membrane according to the invention has a Gurley number of <600 sec. Preferably the Gurley number is <100 sec.

Appropriate membranes 2 are produced by using a relatively thick, extruded, moistened polytetraethylene film that is stretched. In one embodiment membranes 2 are produced by using a relatively thick, extruded, moistened polytetraethylene film that is first stretched in the transverse direction less than three-fold, dried and then stretched in the longitudinal direction first 10- to 100-fold and again in the longitudinal direction between 1:1- to 1:1.5-fold and then in the transverse direction, in which shrinkage of the film is counter acted. Such membranes 2 are described in U.S. Pat. No. 5,476,589.

The membrane 2 according to the invention can also optionally be oleophobized by treatment with an oleophobic material, such as a fluorinated polymer, as for example an acrylic or methacrylic polymer with recurring pendant side claims that terminate with a —CF, group, or a tetrafluoroethylene copolymer such as copolymers of TFE and fluorinated dixoles.

The aerosol separator 3 contained in the plug 1, according to the invention, can be chosen from the group of fiber absorbers, centrifugal separators, cascade separators, inertial separators, a combination of at least two of the aforementioned.

It is particularly preferred if the aerosol separator 3 forms a combination of an inertial separator, a centrifugal separator, and a cascade separator.

The aerosol separator 3 is situated in the plug 1 between the membrane 2 and the gas space 30 of the battery 20. As it shown in FIG. 2, an aerosol separator space 45 is located between the inside surface 6 of the plug 1 and the aerosol separator 3. An exchange of gas between the gas space 30 and the outside 22 of the battery 20 takes place firstly through the aerosol separator 3 and secondly through the liquid impermeable but gas permeable membrane 2. The gas stream 29 coming from the electrolyte 31 includes electrolyte drops and electrolyte aerosol. Aerosol means a gaseous suspension of ultramicroscopic particles of a liquid or a solid. The aerosol separator 3 of the present invention has the function to separate drops and mainly aerosol from the gas stream 29. The aerosol separator 3 prevents the aerosol from reaching the membrane 2 and therefore the pores of the membrane 2 are not closed or sealed by the aerosol. There is no reduction of the gas exchange during the degassing of the battery 20.

Figure 3:
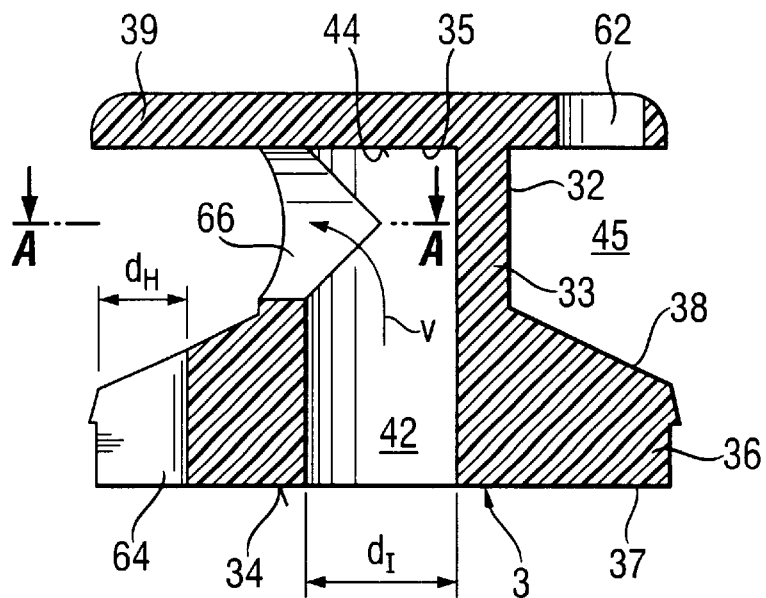
FIG. 3 shows a cross-section of the aerosol separator of the present invention.

FIG. 3 shows one embodiment of the aerosol separator 3. In this embodiment the aerosol separator 3 consists of a hollow cylindrical tube 32 with a tube inside 42 and a tube wall 33. The tube 32 carries an annular, concentric widening 36 on a first end 34 of the tube 32 facing the electrolyte 31. The widening 36 has a diameter substantially equal to the inside diameter dp of the plug 1. A first side 37 of the widening 36 facing the electrolyte 31 is designed essentially perpendicular to axis of inside diameter dp. A second side 38 of the widening 36 is opposite to the first side 37 and forms an angle such that the surface of the second side 38 has a slope that rises in direction of the tube wall 33. In another embodiment the surface of the second side 38 can also be designed to be horizontal. A concentric plate 39 is arranged on a second end 35 of the tube 32 facing away from the electrolyte 31. The diameter of the concentric plate 39 is essentially equal to the inside diameter dp of the plug 1.

The concentric plate 39, the tube 32 and the widening 36 have holes 62, 64 and 66. The plate hole 62 in the plate 39 and the widening hole 64 in the widening 36 run parallel to the tube inside 42. The plate hole 62 and the widening hole 64 are offset by 180°. In one further embodiment the plate 39 may have more than one hole 62. A third hole 66 is arranged in the tube wall 33 of the cylindrical tube 32, this hole tube 66 facing the widening hole 64 in the widening 36 and lying diametrically opposite the plate hole 62 in the plate 39. The plate hole 62 of the plate 39 and the widening hole 64 of the widening 36 form an angle of 90° with the tube hole 66 in the tube wall 33.

Thus, the cylindrical construction of the aerosol separator 3 with the annular concentric widening 36 whereby the second side 38 of the widening 36 rises, forms the inertial and centrifugal separator portion. The plate hole 62, the widening hole 64 and the tube hole 66 and their different location in the aerosol separator 3 (holes being offset by 180°) form the cascade separator portion.

Advantageously, a fiber absorber can additionally be present in the space between the absorber separator 3 and the membrane 2.

Figure 4:
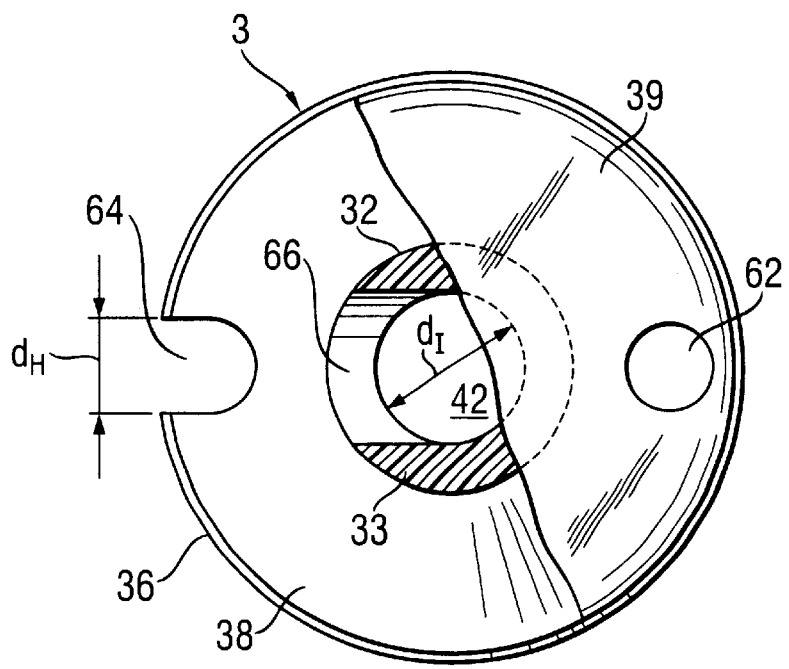
FIG. 4 shows a top view according to the aerosol separator of FIG. 3, partially broken down.

Further details of the aerosol absorber 3 according to the invention are shown in FIG. 4. This figure shows a top view according to FIG. 3, partially broken down. The plate hole 62 is located outside of the middle of the plate 39 so that the second end 35 of the tube 32 is closed. The partially broken down part A of FIG. 4 shows widening hole 64 in the widening 36 of the tube 32. The plate hole 62 and the widening hole 64 are offset by 180°.

The gases with the aerosols formed in the electrochemical processes in the battery 20 enter the widening hole 64 and the tube inside 42 from the open first end 34 of the tube 32. The tube inside 42 has a diameter $d_I$ which is greater than a diameter $d_H$ of the widening hole 64. According to the principle of least resistance, the tube inside 42 with the open first end 35 is therefore the primary entry for gases with aerosols in the aerosol separator 3. At high gas and aerosol occurrence these also flow through hole 64 into the aerosol separator 3.

The aerosol separator space 45 is of greater diameter than the diameter of the widening hole 64 and the tube inside 42, and circular in cross section.

The gases 29, with the aerosols, flowing through the tube inside 42 are diverted on the upper plate inside surface 44 by 90° in the direction of the tube hole 66 and encounter there the gas stream 29 flowing upward through the widening hole 64. The gas streams 29, with the aerosol, are mixed and then diverted centrifugally into a circular path because of the circular cross section and slide along the tube wall 33. During this process the gases 29, with the aerosols, emerge from the tube inside 42 through the tube hole 66 with increased velocity v, because of the much smaller diameter of hole 64 and tube inside 42 relative to the gas space 30 in front of the aerosol separator 3. Since the movement of the gas 29, with the aerosol, in the aerosol separator space 45, the gas 29 may encounter the inside surface 6 of the plug 1 and the second side 38 of the widening 36.

During this process the velocity v of the heavier solid particles such as aerosols is reduced more quickly than that of the gaseous particles. The aerosols are released from the gas and slide downward on the plug inside surface 6, the tube inside 42 and the second side of the widening 38.

After a radial change in direction of 180° the gases escape the aerosol separator 3, after another change in direction of 90°, from the plate longitudinal hole 62. The purified gases reach the membrane 2 through the hole 62. Water vapor can also condense in this process and be fed back to the battery 20.

From there the gases, which are now almost aerosol-free, are released through the membrane 2 and through hole 8 into the outside of the battery 20 e.g. into the atmosphere.

The tube inside 42 with the open first end 34 of the tube 32 also acts as a return for separated electrolyte liquids 31 that were contained in the aerosols. This electrolyte 31 can flow out, on the one hand, through widening hole 64, although his outflow is not always guaranteed because of the limited diameter of widening hole 64. This is especially true for strongly creeping electrolytes, like sulfuric acid. In unfavorable operating positions of the battery 20 electrolyte 31 can also reach the aerosol separator 3 and adversely affect its action. Outflow is ensured in this case as well, since pressure equalization always occurs through the widening hole 64 and the open first end 34 of tube 32.

Optimization of the separator process is possible according to the invention by incorporating so-called blades in the aerosol separator space 45. The supplied gas stream 29, with aerosol, then slides along the inside surface of the blades. This leads to a significantly improved degree of separation.

The widening hole 64 serves for withdrawal of the separated electrolyte 31 from the aerosol separator space 45. If the amount of electrolyte 31 surpasses the throughput of widening hole 64, then tube hole 66 acts as an overflow for widening hole 64.

In addition, in an unfavorable position of the battery 20 it can happen that electrolyte liquid 31, for example, liquid acid, reaches the aerosol separator 3, clogs it and an outflow through the widening hole 64 is not guaranteed when the battery 20 is returned to the normal position. This situation is especially possible if strongly creeping acids, like sulfuric acid, are used. In this case the tube hole 66 represents an additional outflow.

Because of the design of the aerosol separator 3, a combination of paths are created, directed vertically upward, as well as cascade-shaped and centrifugal, through which the liquid fractions of the aerosols are effectively separated. This design unit of an aerosol separator 3 therefore exhibits the properties of an inertial, cascade and centrifugal separator and combines these types of separators into an effective, compact and simply designed component.

If necessary, a fiber absorber can be arranged between the membrane and the top of the aerosol separator 3. This fiber absorber can be fixed on the top of the aerosol separator 3. It is also possible to laminate a fiber absorber layer onto the membrane 2 or onto the bottom of an optionally present support.

What is claimed is:

1. A combination of a battery and a plug, the battery having an outside and an inside, the inside of the battery having an electrolyte and a gas space above the electrolyte; the battery having furthermore at least one opening connecting the gas space with the outside; the plug being situated in the opening and having a liquid impermeable but gas permeable membrane being made of a stretched microporous polytetrafluoroethylene (PTFE) film, and an aerosol separator situated between the membrane and the gas space of the battery, whereby an exchange of gas between the gas space and the outside of the battery takes place through the aerosol separator and the liquid impermeable but gas permeable membrane and the aerosol separator having:

a tube with an open first end facing the electrolyte and a closed second end remote from the electrolyte, at which closed second end a gas stream rising up from the electrolyte is diverted radially outwards, and an aerosol separator space between the tube and an inner side of the plug, to which the diverted gas stream is directed and which guides the gas stream centrifugally into a circular path.

2. The Combination according to claim 1, whereby the membrane contains an oleophobic material.

3. The Combination according to claim 1, whereby the membrane is a laminate.

4. The Combination according to claim 3, whereby the membrane is laminated on at least one support layer.

5. Combination according to claim 1, whereby the membrane has a pore size of at most 1 $\mu$m, a porosity of at least 50% and a dried thickness of at most 20 $\mu$m.

6. Combination according to claim 5, whereby the membrane has a pore size of at most 0.45 $\mu$m, the porosity at least 70% and the dried thickness at most 5 $\mu$m.

7. Combination according to claim 1, whereby the aerosol separator is chosen from one of the following group of separators: a centrifugal separator, a cascade separator, an inertial separator, and a combination of at least two of the aforementioned.

8. Combination according to claim 7, whereby the aerosol separator is a combination of an inertial separator, a centrifugal separator and a cascade separator.

9. Combination according to claim 8, whereby the aerosol separator has a hollow cylindrical tube with a tube wall; the tube having an annular, concentric widening on a first tube end with a first widening side facing the electrolyte and a second widening side opposite to the first side; the second side having a slope that rises in direction to the tube wall; and a concentric plate being arranged on a second tube end facing away from the electrolyte; and the plate, the tube and the widening having holes, in which the plate hole and the widening hole are parallel to the tube wall and being offset by 180° and the tube hole being arranged in the tube wall and lying diametrically opposite the plate hole, in which the plate hole and the widening holes form an angle of 90° to the tube hole.

10. Combination according to claim 9, whereby the hollow cylindrical tube has an first inside diameter and the widening hole has a second inside diameter and the first inside diameter is larger than the second inside diameter.

11. Combination according to claim 1 whereby the gas separator space has blades in the direction of the gas stream.

12. Combination according to claim 1, whereby a fiber absorber is arranged between the membrane and the aerosol separator.

13. Combination according to claim 12, whereby the fiber absorber is fixed on the top of the aerosol separator.

14. Combination according to claim 12, whereby the fiber absorber is laminated onto the membrane.

* * * * *